United States Patent
Houghton (10) Patent No.: US 10,539,372 B2
(45) Date of Patent: Jan. 21, 2020

(54) APPARATUS AND METHOD FOR MOUNTING HEAT PIPES TO PANELS

(71) Applicant: AIRBUS DEFENCE AND SPACE LIMITED, Stevenage, Hertfordshire (GB)

(72) Inventor: John Houghton, Stevenage (GB)

(73) Assignee: AIRBUS DEFENCE AND SPACE LIMITED, Stevenage, Hertfordshire (GB)

( * ) Notice: Subject to any disclaimer, the term of this patent is extended or adjusted under 35 U.S.C. 154(b) by 274 days.

(21) Appl. No.: 14/397,960

(22) PCT Filed: Apr. 23, 2013

(86) PCT No.: PCT/EP2013/058404
§ 371 (c)(1),
(2) Date: Oct. 30, 2014

(87) PCT Pub. No.: WO2013/164226
PCT Pub. Date: Nov. 7, 2013

(65) Prior Publication Data
US 2015/0122454 A1 May 7, 2015

(30) Foreign Application Priority Data
Apr. 30, 2012 (EP) ..................................... 12275055

(51) Int. Cl.
*F28D 15/02* (2006.01)
*F28D 15/04* (2006.01)
(Continued)

(52) U.S. Cl.
CPC .......... *F28D 15/0275* (2013.01); *B23P 15/26* (2013.01); *B64G 1/506* (2013.01);
(Continued)

(58) Field of Classification Search
CPC ................. F28D 15/0275; F28D 15/04; F28F 2275/025; F28F 2275/20; B64G 1/506; H01L 23/4006; H01L 23/427
See application file for complete search history.

(56) References Cited

U.S. PATENT DOCUMENTS 5,082,405 A * 1/1992 Witten .................... B29C 65/42
411/178
5,331,510 A * 7/1994 Ouchi ................. F28D 15/0275
165/104.33
(Continued)

FOREIGN PATENT DOCUMENTS

EP 00776827 A1 6/1997
JP 05-079969 U 10/1993
(Continued)

OTHER PUBLICATIONS

Japanese Office Action, dated Dec. 13, 2016, in related JP Appln. No. 2015-509371, and partial English summary.

*Primary Examiner* — Nelson J Nieves
(74) *Attorney, Agent, or Firm* — Fisherbroyles, LLP; Robert Kinberg (57) ABSTRACT

A structural panel for a satellite comprising an elongate pipe mounted thereto. The heat pipe is bonded to the panel intermediate its remote ends with a thermally conductive adhesive. The adhesive is omitted proximate at least one distal end of the heat pipe. The at least one distal end of the heat pipe without adhesive is mechanically secured to the panel by at least one bolt received in a cooperating threaded receiving element. A method of manufacturing such a panel is also provided.

13 Claims, 11 Drawing Sheets

(51) Int. Cl.
  *B64G 1/50* (2006.01)
  *B23P 15/26* (2006.01)
(52) U.S. Cl.
  CPC ........ *F28D 15/04* (2013.01); *F28F 2275/025* (2013.01); *F28F 2275/20* (2013.01); *Y10T 29/49353* (2015.01)

(56) References Cited

U.S. PATENT DOCUMENTS

| | | | |
|---|---|---|---|
| 5,682,943 A * | 11/1997 | Yao | B64G 1/50 165/104.21 |
| 5,806,803 A | 9/1998 | Watts | |
| 6,776,220 B1 | 8/2004 | Low et al. | |
| 6,938,679 B1 * | 9/2005 | Ito | B64D 47/00 165/104.21 |
| 6,966,363 B2 | 11/2005 | Gailus et al. | |
| 7,405,937 B1 * | 7/2008 | Wang | H01L 23/4006 165/104.33 |
| 2002/0067598 A1 * | 6/2002 | Sathe | H01L 23/4006 361/700 |
| 2002/0102384 A1 | 8/2002 | Peck et al. | |
| 2005/0103473 A1 * | 5/2005 | Todd | F28D 15/0275 165/104.11 |
| 2006/0076458 A1 * | 4/2006 | Russell | B64D 47/00 244/158.1 |
| 2009/0218076 A1 * | 9/2009 | Mauduit | B23P 15/26 165/104.14 |
| 2010/0172088 A1 * | 7/2010 | Lian | G06F 1/20 361/679.47 |
| 2010/0188811 A1 * | 7/2010 | Liang | G06F 1/20 361/679.52 |
| 2012/0125571 A1 * | 5/2012 | Lutz | B64G 1/503 165/104.21 |
| 2013/0020055 A1 * | 1/2013 | Wu | B23P 15/26 165/104.26 |

FOREIGN PATENT DOCUMENTS

| | | |
|---|---|---|
| JP | 07-025395 A | 1/1995 |
| JP | 08-053100 A | 2/1996 |
| JP | 11-210159 A | 8/1999 |
| JP | 2000-039272 A | 2/2000 |
| JP | 2002-120310 A | 4/2002 |
| JP | 2003-127894 A | 5/2003 |
| JP | 2005-505927 A | 2/2005 |
| JP | 3171055 U | 9/2011 |
| JP | 2011-246112 A | 12/2011 |

* cited by examiner

APPARATUS AND METHOD FOR MOUNTING HEAT PIPES TO PANELS

TECHNICAL FIELD

The present invention relates to a means for mounting heat pipes to panels and, in particular, to mounting of heat pipes to carbon fibre reinforced plastic panels.

BACKGROUND

Spacecraft, such as scientific and telecommunication satellites, contain high power equipment that generates significant amounts of heat which needs to be dissipated away from the equipment. Such equipment is conventionally mounted on structural panels of the satellite which may comprise carbon fibre reinforced plastic ("CFRP") sandwich panels. These panels comprise a honeycomb core sandwiched by a CFRP skin on either side thereof. Such panels are very light and strong, providing excellent structural strength, but are poor conductors of heat and so controlling the temperature of such high power equipment can be problematic. Accordingly, it is necessary to provide separate means for heat dissipation. This may comprise "thermal doublers" which are thicker sheets of CFRP than those of the skin of the panel, to improve the thermal conductivity. Alternatively, devices known as "heat pipes" may be used.

Heat pipes comprise metallic (usually aluminium) pipes containing a thermally conductive fluid and which are thermally coupled to the heat-generating equipment and are mounted to the surface of the CFRP panels and extend away from the equipment such that heat can be conducted away from the equipment and dissipated to ambient surroundings. Heat pipes are more thermally efficient than thermal doublers which require more total mass than heat pipes to control the same temperature for a given power dissipation. Heat pipes may comprise a loop heat pipe system in which coolant is pumped around a closed loop of the heat pipe system, requiring a pump and active control electronics which add complexity, expense and additional mass to the equipment. Alternatively, the heat pipes may comprise passive heat pipes which are sealed pipes containing a coolant fluid which passively conducts heat along the heat pipe away from the heat source to which it is thermally coupled. Passive heat pipes are cheaper, simpler and lighter than heat pipe loop systems.

The metallic heat pipes, by necessity, are good conductors of heat, whereas the CFRP panels to which they are mounted are poor conductors of heat. Additionally, the coefficient of thermal expansion ("CTE") of metallic heat pipes differs significantly to that of CFRP. Metallic heat pipes expand significantly more upon heating than do CFRP panels. CFRP panels show very little expansion upon heating, making them good for mounting of equipment that requires accurate positioning and alignment. Previous attempts to mount heat pipes to CFRP panels have involved bonding the heat pipes to the CFRP panel surface. However, when in use, the adhesive bonds are prone to failure and cracking under "excursion temperatures", that is, when subjected to temperatures significantly above or below ambient/assembly temperature, due to the high thermo-elastic stress generated by the metallic heat pipes contracting and expanding to a greater degree than the CFRP panels to which they are attached. This differential expansion results in forces within the structure urging the CFRP panel from a planar shape into a curved shape, fracturing the adhesive bond, and the heat pipe may come away from and/or fracture the CFRP panel skin. Aside from weakening the attachment of the heat pipes to the CFRP panels, a cracked adhesive bond also has a greatly reduced thermal conductivity than a bond that is intact, which greatly reduces the heat transfer capacity of the adhesive between the CFRP panel and the heat pipe. The thermo-elastic loads and peak stresses generated in the heat pipe are generally concentrated at the remote ends of the heat pipe and create a peeling force acting to separate the ends of the heat pipe from the CFRP panel surface, and a shear force between the heat pipe and the CFRP panel surface.

SUMMARY

In accordance with embodiments of the invention, there is provided a structural panel for a satellite comprising an elongate heat pipe mounted thereto, wherein the heat pipe is bonded to the panel intermediate its remote ends with a thermally conductive adhesive, and wherein the adhesive is omitted proximate at least one distal end of the heat pipe, the at least one distal end of the heat pipe without adhesive being mechanically secured to the panel by at least one bolt received in a cooperating threaded receiving element.

The threaded receiving element may comprise an insert embedded within the panel.

The at least one end of the heat pipe may comprise four bolts securing it to the panel, the four bolts being configured in a substantially quadrilateral arrangement.

The adhesive proximate the at least one end of the heat pipe may terminate at least 10 mm from the central axis of the nearest bolt securing the heat pipe to the panel.

A material of the panel or panel surface may have a coefficient of thermal expansion different to that of the material of the heat pipe.

The panel may comprise a CFRP sandwich panel and the heat pipe may be metallic.

The heat pipe may include a flange extending from the at least one distal end of the heat pipe and the at least one bolt may extend through the flange into the panel.

The at least one distal end of the heat pipe may be tapered.

The panel may comprise a skin doubler comprising a layer of panel material bonded to a surface of the panel, and the heat pipe may be bonded and bolted to the skin doubler. Alternatively, the heat pipe may be bonded and bolted directly to a surface of the panel. Yet further, the panel may comprise one or more discrete sections of skin doubler bonded to the surface of the panel proximate at least one remote end of the heat pipe, at which point(s) the heat pipe may be bolted to the discrete section(s) of skin doubler.

An adhesive layer bonding the heat pipe to the skin doubler, or the skin doubler to the panel surface, or the heat pipe to the panel surface, may be between 0.2 mm-1 mm in thickness. An adhesive layer of greater than 0.2 mm may be preferable to provide optimum resistance to shear force failure of the bond, and an adhesive thickness of less than 1 mm may be preferable to provide optimum resistance against peel force failure of the bond. An adhesive layer of 0.2 mm-0.5 mm may preferably be provided for optimum thermodynamic performance.

The heat pipe may be embedded within the panel.

The heat pipe may include a flange extending from the at least one distal end of the heat pipe, the flange may be disposed against a surface of the panel, the at least one bolt may extend through the flange into the panel.

Embodiments of the invention also provide a method of manufacturing a structural panel for a satellite comprising bonding an elongate heat pipe to the panel with a thermally conductive adhesive intermediate remote ends of the heat pipe, omitting the adhesive proximate at least one distal end of the heat pipe, and mechanically securing the at least one distal end of the heat pipe without adhesive to the panel by at least one bolt received in a cooperating threaded receiving element.

The threaded receiving element may comprise a threaded insert, and the method may comprise embedding the insert within the panel and fixing the insert in place with a securing compound.

The adhesive bonding the heat pipe to the panel may be cured during or after the at least one bolt is secured to the panel.

BRIEF DESCRIPTION OF THE DRAWINGS

Embodiments of the present invention will now be described, by way of example only, with reference to the accompanying drawings, in which.

DETAILED DESCRIPTION

Referring to FIGS. 1-5, a first embodiment 1 of the invention is shown and comprises a CFRP sandwich panel 10 comprising a honeycomb core 11 with skins 12a, 12b of CFRP provided on the major surface on either side. A skin doubler 13 comprising a strip of CFRP skin material is provided on one side of the CFRP panel, upon which is mounted a heat pipe 14. The skin doubler 13 is of similar thickness to the skins 12a, 12b, for example, where the CFRP skins 12a, 12b may be around 0.5 mm thick. The skin doubler 13 is bonded to the CFRP panel skin 12a by a thermally conductive adhesive 29 and provides extra shear strength to the CFRP panel/heat pipe structure.

Figure 2:
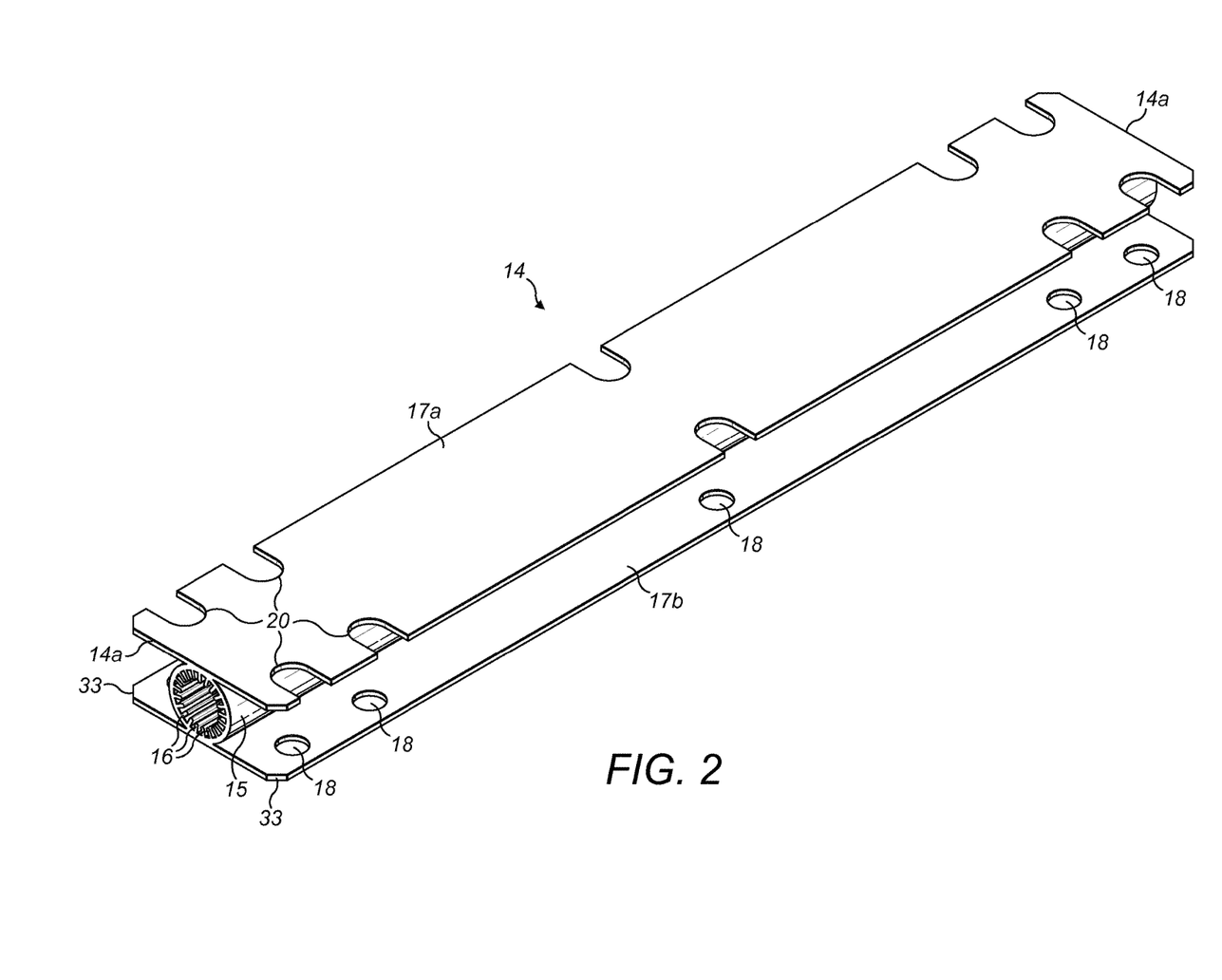
FIG. 2 shows a perspective view of a heat pipe with the cross-section of the heat pipe visible.
Figure 3:
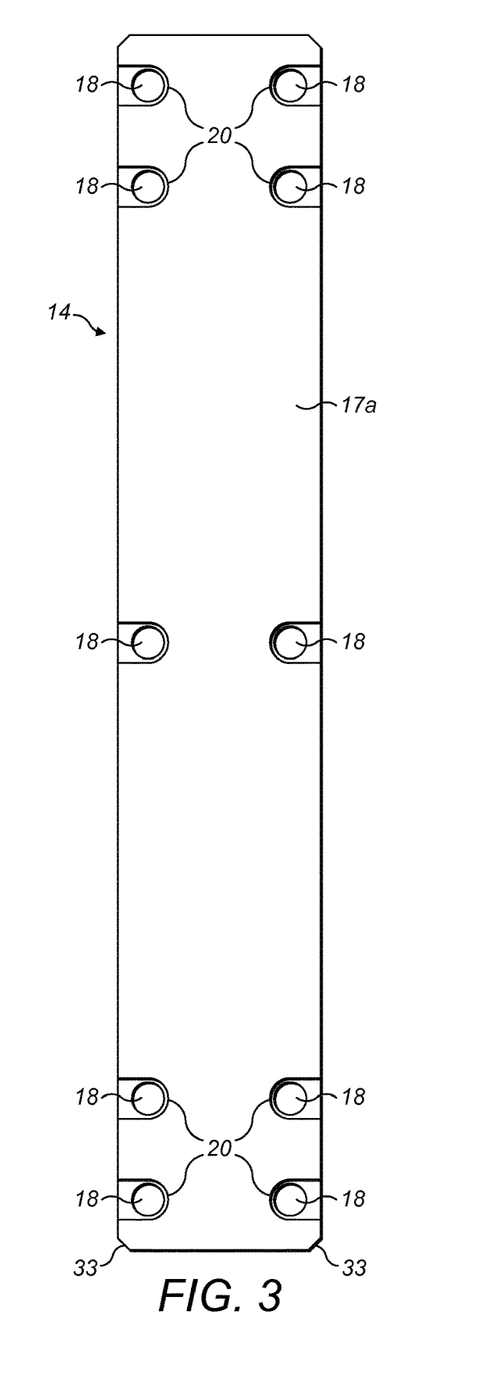
FIG. 3 shows a schematic plan view from above of the heat pipe of FIG. 2.

The heat pipe 14 is shown in more detail in FIGS. 2 and 3, and comprises a hollow tube 15 with internally-projecting fins 16 and upper and lower parallel elongate planar flanges 17a, 17b formed integrally with the hollow tube 15 and disposed on opposite sides thereof. (The heat pipe 14 is shown with an open end in FIG. 2 purely to illustrate the internal pipe structure, but would obviously be closed-ended in use). The closed heat pipe 14 contains a coolant fluid, which may be ammonia, and works with an isothermic action by the heat from the equipment evaporating the liquid coolant which then diffuses along the heat pipe 14, dissipating the heat to a cooler area of the heat pipe 14 and out to ambient surroundings. The coolant condenses when it cools and is conveyed back to the area of the heat source by capillary action between the closely spaced fins 16 within the hollow tube 15. The heat pipe 14 thereby acts to dissipate heat away from the heat source in a passive manner.

The lower elongate flange 17b includes four holes 18, two on either side of the hollow tube 15, for receiving mounting bolts 19. The holes 18 are formed proximate a remote end 14a of the heat pipe. The upper elongate flange 17a includes four cut-outs 20 corresponding to the respective positions of the four holes 18 to allow access to the heads 19a of the bolts 19.

Figure 4:
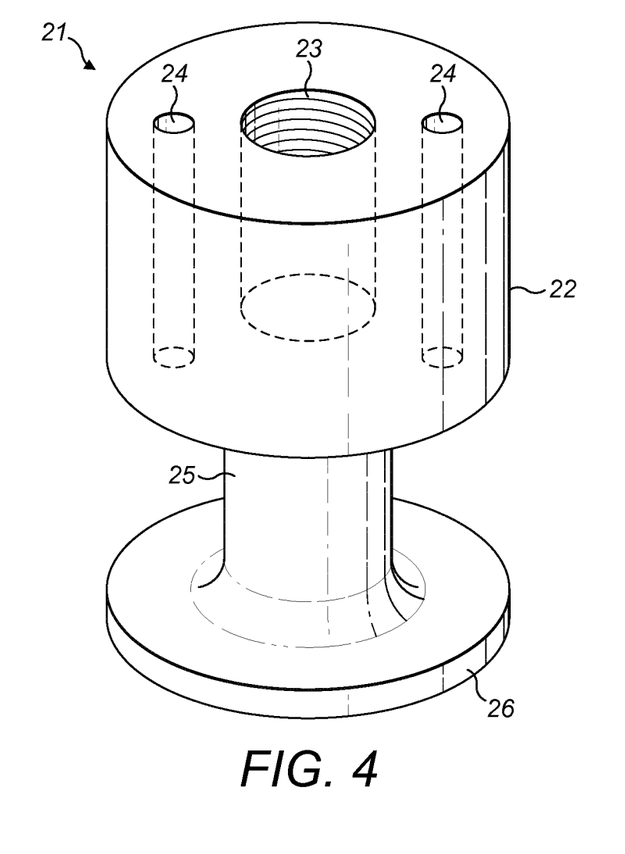
FIG. 4 shows a perspective view of a threaded bolt-fixing insert of the panel of FIG. 1.
Figure 5:
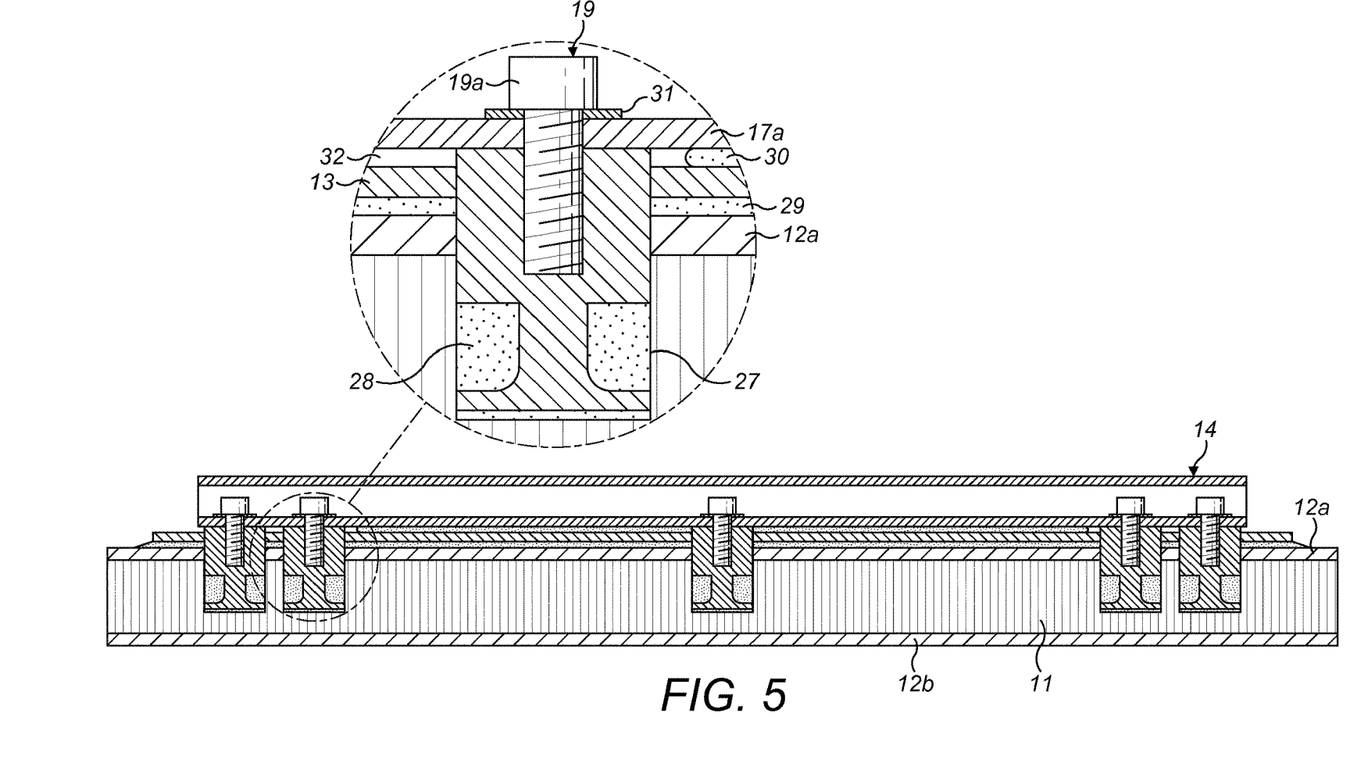
FIG. 5 shows a cross-sectional side view of the CFRP panel of FIG. 1 showing the threaded bolt-fixing insert embedded within the panel.

The CFRP panel 10 includes ten threaded inserts 21 embedded within the panel, one of which is shown in FIG. 4 and five of which are shown in cross-section in FIG. 5, including an enlarged view of one such insert. The inserts 21 comprise a head 22 with a threaded central aperture 23, and two smaller passages 24 extending all of the way through the head 22 from one side to the other, located near the perimeter edge of the head 22 and on opposite side of the threaded central aperture 23. A central stem 25 extends from the underside of the head 22 and terminates in a flared flange 26.

The inserts 21 are fixedly embedded in the CFRP panel 10 by a hole 27 being drilled in the panel through the skin doubler 13 and the upper skin 12a and partly through the honeycomb core 11. The insert 21 is placed in the hole 27 and a potting compound 28 is injected through one of the two passages 24 which fills the space in the hole 27 around the insert stem 25 and flared flange 26, and any honeycomb cells in open communication with the drilled hole 27. The potting compound 28 comprises resin, a hardening compound and microballoons (tiny hollow glass spheres as a filler material). The potting compound 28 sets hard and thereby securely bonds the insert 21 within the CFRP panel 10. The insert 21 is positioned in the hole 27 in the panel 10 such that the head 22 of the insert 21 sits slightly proud of the surface of the skin doubler 13 by approximately 0.2 mm (+/−0.05 mm).

Figure 1:
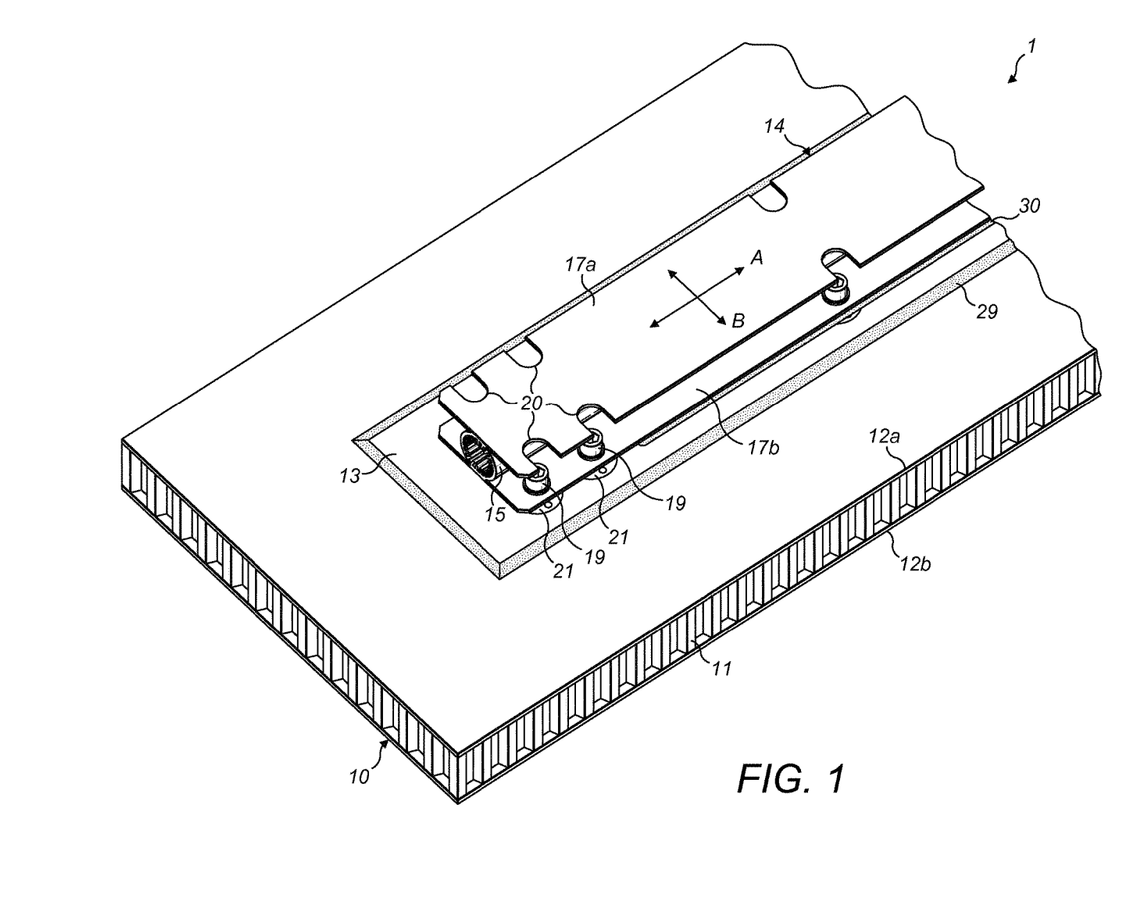
FIG. 1 shows a CFRP panel with attached heat pipe according to a first embodiment of the invention.

The heat pipe 14 is mounted to the CFRP panel 10 by being bonded to the skin doubler 13 using a thermally conductive adhesive 30 along all of its length apart from the remote ends 14a of the heat pipe 14 proximate the holes 18 in the lower flange 17b. No adhesive 30 is applied between the heat pipe 14 and the skin doubler 13 at the remote ends ma of the heat pipe 14. Here, the heat pipe sits on the inserts 21 and bolts 19 extend through washers 31 provided between the heat pipe 14 and bolt heads 19a, through the holes 18 in the lower flange 17b of the heat pipe 14, and are received in the threaded central apertures 23 of each of the inserts 21. The bolts 19 thereby mechanically secure the ends 14a of the heat pipe 14 to the CFRP panel 10. Furthermore, the heads 22 of the inserts 21 sitting slightly proud of the surface of the skin doubler 13 provides a space 32 between the underside of the lower flange 17b of the heat pipe 14 and the upper surface of the skin doubler 13 for the layer of adhesive to be provided with a thickness corresponding to the gap height.

The point on the heat pipe 14 at which the adhesive finishes is spaced in a longitudinal direction of the heat pipe 14 from the location of the bolts 19/inserts 21. The heat pipe 14 being secured to the CFRP panel 10 in the above-described manner results in an advantageous dual-function joint with a separation of the bolted attachment from the thermally conductive interface provided by the adhesive 30.

The bolts 19 carry the largest part of the high thermo-elastic loads at the heat pipe ends 14a, and protect the bonded adhesive 30 from cracking or otherwise failing under these high loads to ensure that the adhesive attachment can remain intact and thereby provide an efficient thermal conductance path from the high power equipment and CFRP panel 10 to the heat pipe 14.

Aside from the sets of four bolts 19, and respective inserts 21 at the remote ends 14a of the heat pipe 14, the heat pipe 14 is also provided with additional bolts 19 at its mid-point 14b to mechanically secure the heat pipe 14 to the CFRP panel 10 in addition to the adhesive 30 bond at this location. Here, the heat pipe 14 includes holes 18 in the lower flange 17b through which the bolts 19 extend and are received in inserts 21 in the CFRP panel 10, as described above.

The corners 33 of the lower flange 17b of the heat pipe 14 are chamfered, but may alternatively be rounded, or preferably another non-square configuration. This helps reduce corner peaking of stress generated on the CFRP skin 14a or skin doubler 13 surface at the heat pipe ends 14a.

The configuration of the four bolts 19 arranged in a generally square layout on the lower flange 17b of the heat pipe 14 at the distal ends 14a thereof is particularly advantageous as it counteracts the bending forces between the heat pipe 14 and CFRP panel 10 in two perpendicular directions, namely the longitudinal direction of the heat pipe 14 (shown by arrow A in FIG. 1) and the direction perpendicular to the longitudinal direction of the heat pipe 14 (shown by arrow B in FIG. 1). This arrangement thereby effectively counteracts the peel forces acting to pry the heat pipe 14 away from the CFRP panel surface when the overall structure is subjected to excessive temperature variations. However, the invention is not intended to be limited to this particular configuration of securing bolts 19. The bolts 19 also effectively carry a high proportion of the shear forces acting between the heat pipe 14 and the CFRP panel skin 12a/skin doubler 13, again, protecting the adhesive 30 from cracking.

A method of manufacturing a CFRP panel/heat pipe structure 1 of the first embodiment of the invention will now be described. A CFRP sandwich panel 10 comprising the honeycomb core 11 with upper and lower CFRP skins 12a, 12b is provided with a skin doubler 13 comprising a layer of CFRP of around 2 mm in thickness. The skin doubler 13 is bonded to the upper skin surface 12a of the CFRP panel 10 using a thermally conductive adhesive 29, the adhesive fillets formed at the edges of the skin doubler 13, and the adhesive 29 allowed to cure.

Holes 27 are drilled through the skin doubler 13 and into the CFRP panel core 11 of a dimension slightly larger than the diameter of the heads 22 of the bolt-receiving inserts 21. The holes 27 are positioned in two groups of four in a square/rectangular arrangement corresponding to the intended position of the end holes 18 in the ends 14a of the lower flange 17b of the heat pipe 14. Furthermore, two holes are formed at the location of the mid-point 14b of the intended heat pipe 14 location corresponding to the position of the mid point holes 18 in the lower flange 17b of the heat pipe 14. Inserts 21 as described above are fitted into the holes 27 and a potting compound 28 as described above is injected into one of the passages 24 in the head of each insert 21. The potting compound 28 fills the space beneath the head 22 of each insert 21 and any space in the honeycomb core cavities in communication with the respective drilled hole 27. The inserts 21 preferably are positioned within each hole 27 such that the head 22 of each projects above the surface of the skin doubler 13 by 0.2 mm +/−0.05 mm. The potting compound 28 is allowed to cure, fixing the inserts 21 in position.

A heat pipe 14 is then mounted to the skin doubler 13 by bolts 19 being provided through the respective holes 18 in the lower flange 17b of the heat pipe 14 and received in respective threaded inserts 21 in the CFRP panel 10. An adhesive 30 is also applied between the lower flange 17b of the heat pipe 14 and the skin doubler 13 between the distal ends 14a of the heat pipe 14, such that the layer of adhesive 30 stops short of, and is spaced from, the innermost bolts 19 at the ends 14a of the heat pipe 14. As such, no adhesive 30 is provided between the heat pipe 14 and the skin doubler 13 at the distal ends ma of the heat pipe 14 where the bolts 19 secure the heat pipe 14 to the CFRP panel 10. The bolts 19 are installed in place and set to the required torque during the adhesive curing process or prior to the adhesive curing process such that the adhesive is post-cured after bolt installation.

Figure 6:
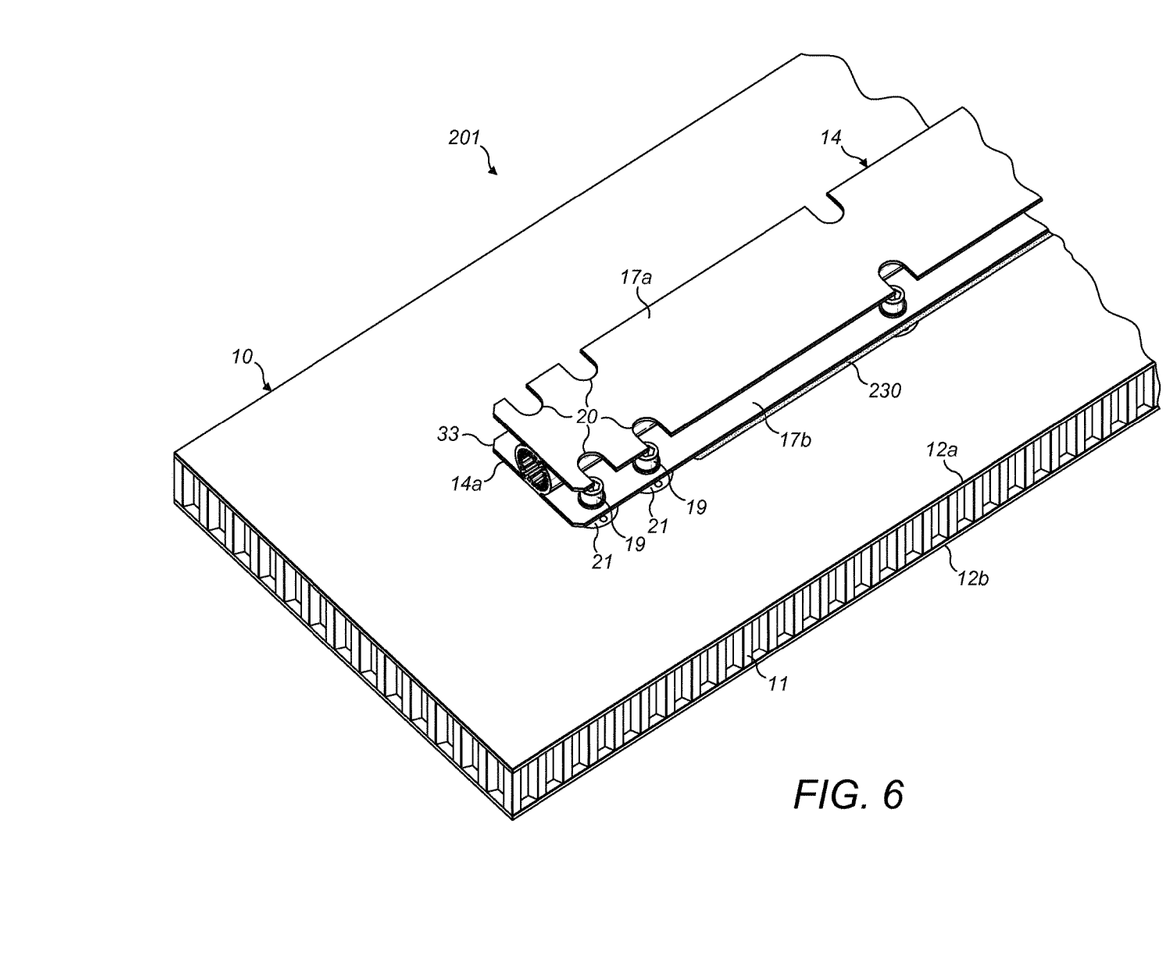
FIG. 6 shows a CFRP panel with attached heat pipe according to a second embodiment of the invention.

A second embodiment of the invention 201 is shown in FIG. 6, and comprises a CFRP sandwich panel 10 with a heat pipe 14 mounted thereon, as with the first embodiment of the invention shown in FIGS. 1-5 and described above. Like features between the first and second embodiments retain the same reference numerals and a detailed description of these features will not be repeated. One difference of the CFRP panel 10 and heat pipe structure 14 of the second embodiment 201 of the invention from that of the first embodiment 1 is that the skin doubler 13 is omitted in the structure 201 of the second embodiment of the invention. Instead, the lower flange 17b of the heat pipe 14 is bonded directly onto the upper skin 12a of the CFRP panel 10, and is bonded thereto using a more thermally conductive adhesive 230, to ensure the thermal conductivity between the CFRP panel skin 12a and the heat pipe 14 is at an acceptable level in the absence of a skin doubler 13. As with the first embodiment 1 of the invention, the adhesive 230 between the CFRP panel skin 12a and the heat pipe 14 stops short of the distal end of the heat pipe 14a, at which location the heat pipe 14 is only mechanically secured to the CFRP panel 10 by bolts 19 as described previously. Therefore, the CFRP panel and heat pipe structure 201 of the second embodiment of the invention exhibits the same physical/structural advantages as described above with reference to the first embodiment 1 of the invention.

Figure 7:
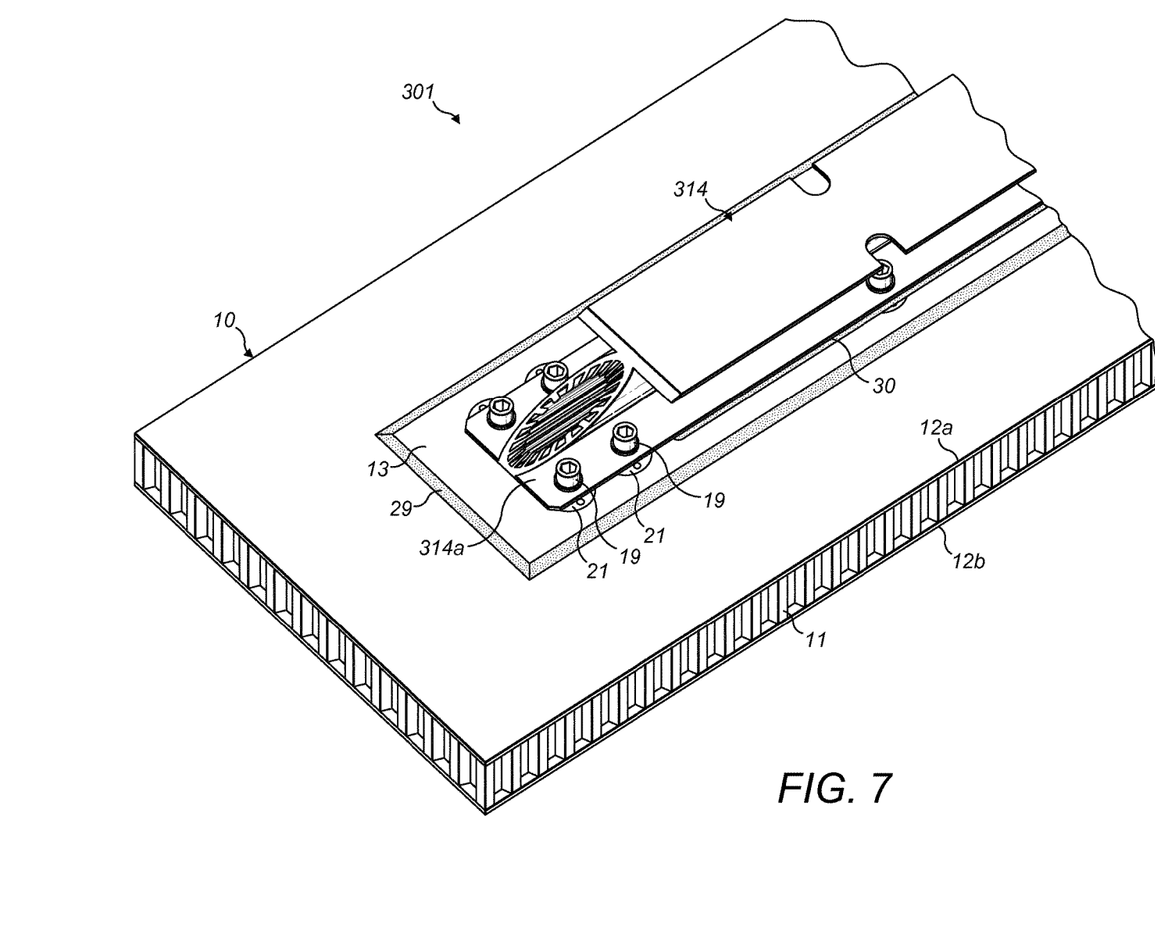
FIG. 7 shows a CFRP panel with attached heat pipe according to a third embodiment of the invention.

A CFRP panel 10/heat pipe 314 structure 301 of a third embodiment of the invention is shown in FIG. 7 and is similar to the first embodiment 1 described above, and so like features retain the same reference numerals and a detailed description thereof will not be repeated. One difference between the structure 301 of the third embodiment of the invention and the first is that the ends 314a of the heat pipe 314 are not square but instead are tapered. The invention is not limited to a specific angle of taper but may, in one embodiment, be, for example, around 17° from the horizontal. This tapered heat pipe 314 construction advantageously helps dissipate the forces and stresses at the distal ends 314a of the heat pipe 314 over the CFRP panel surface.

The panel/heat pipe structures 1, 201, 301 of the first to third embodiments of the invention described above comprise the heat pipes 14, 314 being mounted to the surface of the CFRP panels 10. However, it is intended that CFRP panels with embedded heat pipes are also to fall within the scope of the invention. Such a fourth embodiment 401 of the invention is shown in FIGS. 8-9 and comprises a CFRP sandwich panel 410 as described previously, having a honeycomb core 411 with a skin 412a, 412b on either side.

However a channel 435 is formed in the surface of the CFRP panel 410 and a heat pipe 414 is disposed within the channel 435.

Figure 8:
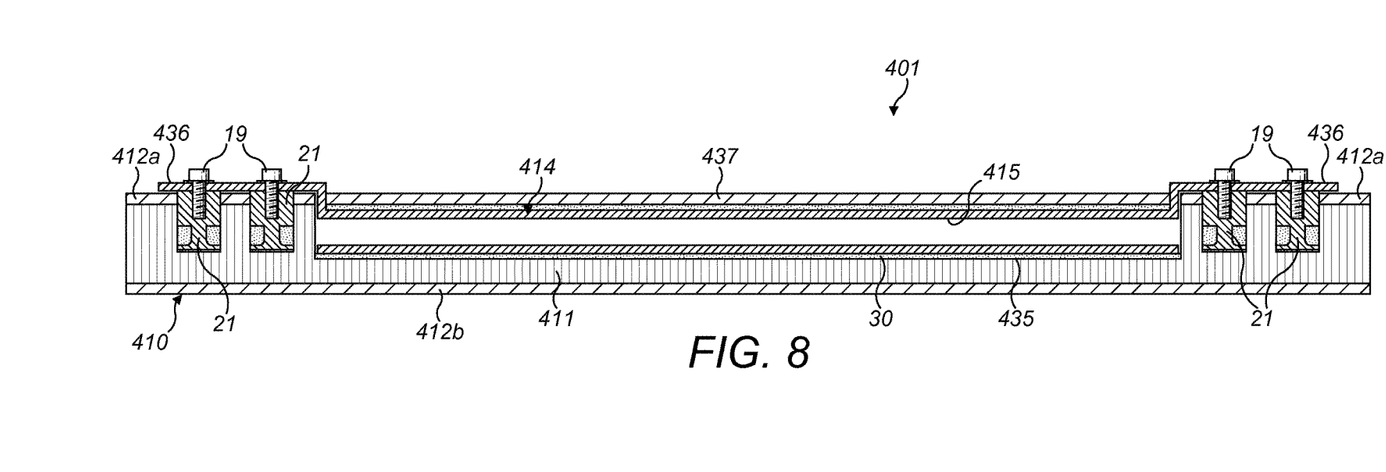
FIG. 8 shows a CFRP panel with an embedded heat pipe according to a fourth embodiment of the invention.
Figure 9:
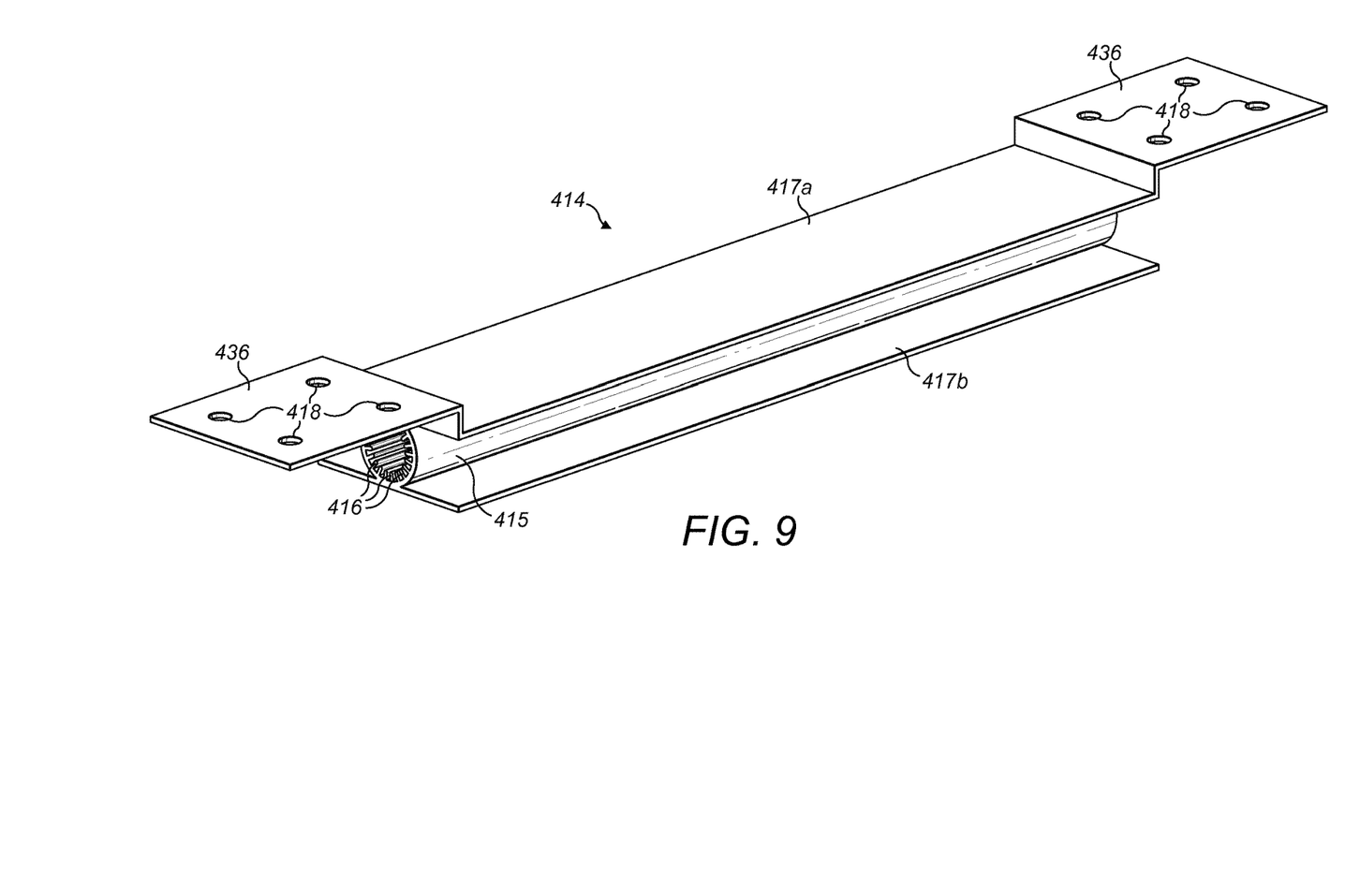
FIG. 9 shows a perspective view of the heat pipe of FIG. 8 in isolation.

As with the heat pipe 14 shown in FIGS. 1 and 2, the heat pipe 414 of FIGS. 8 and 9 also comprises a hollow tube 415 with internally-projecting fins 416, and upper and lower parallel elongate flanges 417a, 417b formed integrally with the hollow tube 415 and disposed on opposite sides thereof. However, one difference of the heat pipe 414 of the fourth embodiment 401 of the invention is that the upper flange 417a extends beyond the end 415a of the hollow tube 415 at the remote ends 414a of the heat pipe 414, and this extended portion 436 of the upper flange 417a is stepped up above the level of the flange 417a that is integral with the hollow tube 415. The extended portion 436 of the flange 417a is also provided with four holes 418 in a generally square or rectangular arrangement for receiving mounting bolts 19. The heat pipe 414 is received in the channel 435 in the CFRP panel 410 such that the extended portion 436 of the upper flange 417a lies over the upper skin 412a of the CFRP panel 410 adjacent the end of the channel 435.

The CFRP panel 410 includes four threaded inserts 21 embedded within the panel 410, as described previously with respect to the first embodiment of the invention, and so a detailed description thereof will not be repeated. The four inserts 21 are disposed in the CFRP panel 410 proximate the end of the channel 435 and are positioned corresponding to the location of the four holes 418 in the extended portion 436 of the upper flange 417a of the heat pipe 414.

The CFRP panel 410 with embedded heat pipe 414 is constructed as follows. A channel 435 to receive the heat pipe 414 is formed in the honeycomb core 411 and a CFRP skin 412b is bonded to the underside of the core 411, and a first upper CFRP skin 412a bonded to the upper surface of the core 411 with a hole therein corresponding to the size of the channel 435. The four bolt-receiving inserts 21 are fixed within the CFRP panel 410 through the upper skin 412a located as described above. The heat pipe 414 is then inserted in the channel 435 in the core 411 and bonded in place by an adhesive 30 between the lower flange 417b and the bottom wall of the channel 435. However, no adhesive 30 is provided between the extended portion 436 of the upper flange 417a of the heat pipe 414 and the upper surface of the upper skin 412a of the CFRP panel 410. The step of the extended portion 436 of the upper flange 417a of the heat pipe 414 thereby allows the extended portion 436 of the flange 417a to rise over the first upper skin 412a and sit on top of the four inserts 21. The extended portion 436 of the upper flange 417a of the heat pipe 414 is secured to the CFRP panel 410 solely by bolts 19 extending through the holes 418 in the extended portion 436 of the upper flange 417a, which are received in the threaded central apertures 23 of each of the inserts 21. A second CFRP skin 437 is then bonded to the upper surface of the core 411 and upper flange 417a of the heat pipe 414.

Accordingly, the CFRP panel and embedded heat pipe structure 401 of the fourth embodiment of the invention provides the same dual function joint between the heat pipe 414 and the CFRP panel 410 as described above, in which the high thermo-elastic loads are carried by the bolted attachments 19, allowing the efficient thermal conductance of the intact bonded adhesive attachment 30.

Figure 10:
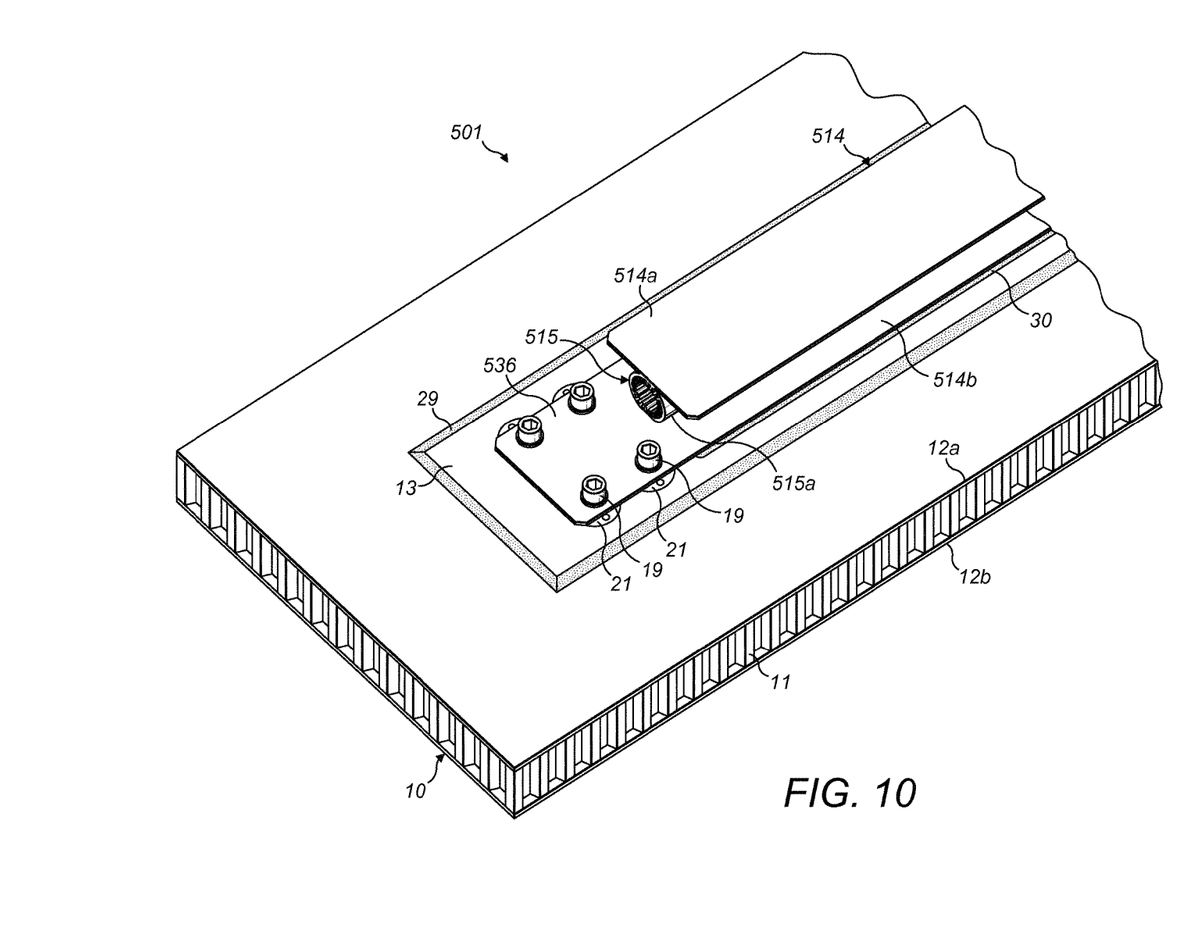
FIG. 10 shows a CFRP panel with attached heat pipe according to a fifth embodiment of the invention.

A fifth embodiment 501 of the invention is shown in FIG. 10 and is similar to the first embodiment 1 shown in FIG. 1, and like features retain the same reference numerals and a detailed description will not be repeated. One difference of the fifth embodiment from the first embodiment is that the lower flange 517b of the heat pipe 514 includes an extended portion 536 and the holes 518 for receiving the bolts 19 for the heat pipe 514 to be mechanically secured to the CFRP panel 10 are formed in the extended portion 536 of the lower flange 517b. The adhesive 30 which bonds the heat pipe 514 to the skin doubler 13 still stops short of, and is spaced from, the location of the inserts 21 and the securing bolts 19. The combination of mechanical bolt fastenings 19 and adhesive bonds 30 of the fifth embodiment 501 of the invention provide all of the same technical advantages as provided by the first embodiment 1 of the invention described above. Such an embodiment with an extended lower flange 536 beyond the end(s) 515a of the hollow tube 515 of the heat pipe 514 may equally be applied in combination with the third embodiment of the invention having the tapered heat pipe ends 314a, within the scope of the invention.

Figure 11:
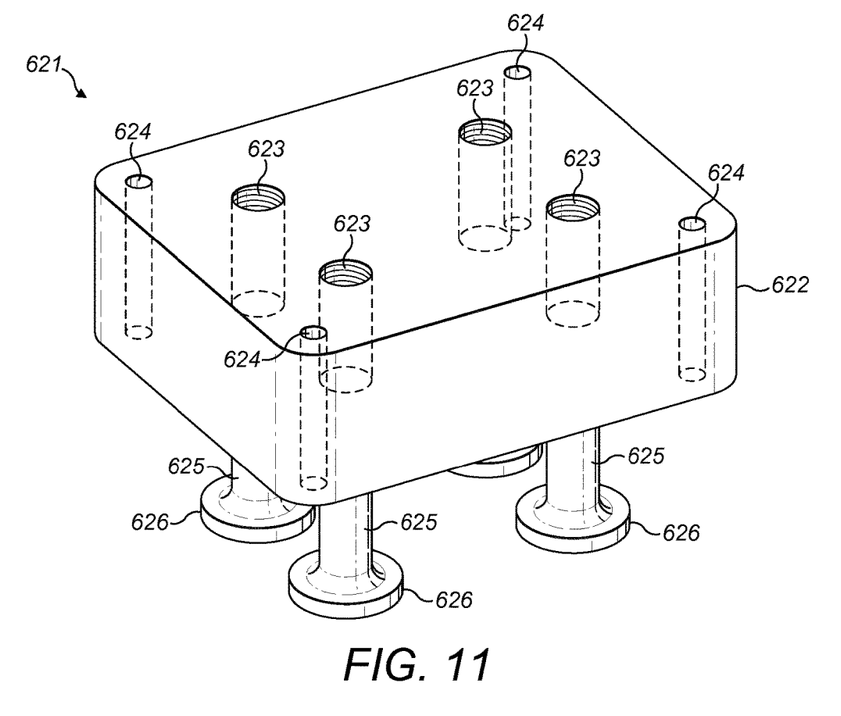
FIG. 11 shows an alternative configuration of threaded bolt-fixing insert according to a sixth embodiment of the invention.

The embodiments of the invention shown in FIGS. 1-10 and described above all include a plurality of individual threaded bolt-receiving inserts 21 within the CFRP panel to receive individual bolts 19. However, the invention is not intended to be limited to this particular configuration of insert. An alternative configuration of insert 621 to receive the securing bolts is intended within the scope of the invention, and is shown in FIG. 11. Instead of individual inserts to receive each bolt, a block insert may be used comprising a large head 622 with a plurality of threaded apertures 623 formed therein, and a number of smaller passages 624 extending all of the way through the head 622 from one side to the other. One or more stems 625 may extend from the underside of the head 622 and terminate in respective flared flanges 626. The individual bolts 19 to secure the heat pipe to the CFRP panel would be received in respective ones of the plurality of threaded apertures 623. In such a configuration, a single recess would need to be formed in the CFRP panel to receive the single multi-aperture insert 621, which would be secured in place as described previously, by a potting compound 18 being introduced through the passages 624 formed through the head 622, to fill the space in the hole around the insert stems 625 and flared flanges 626, and any honeycomb cells in open communication with the hole. The potting compound 18 would then set hard and securely bond the insert 621 within the CFRP panel. The resulting structure would still provide a separation of the bolted attachment from the adhesive bonded attachment of the heat pipe, thereby providing the advantages of the invention as described above.

The embodiments of the invention described above all comprise aluminium heat pipes mounted to CFRP panels. However, the invention is not intended to be limited to structures of these specific materials and would equally extend to any heat pipe/structural panel material combination in which each material has a different coefficient of thermal expansion. Such alternative heat pipe material may include, for example, steel or titanium. Furthermore, such means of mounting heat pipes to panels may also be applied to heat pipe/panel structures made of the same or similar materials having the same/similar coefficients of thermal expansion. Yet further, although the panels in the embodiments of the invention described above all comprise sandwich panels made of a honeycomb core with a skin on either side thereof, the invention is not intended to be limited to structures including such panels, and may equally apply to panels of other construction/configuration, for example, multi-ply laminate CFRP panels comprising a plurality of carbon fibre woven layers.

A further (unillustrated) embodiment of CFRP panel/heat pipe structure intended to fall within the scope of the invention may comprise a structure as with the first embodiment of the invention, except that the skin double is not provided along the entire length of the heat pipe, but instead, discrete skin doubler sections are provided at the ends of the heat pipe where the bolts/inserts are located such that the bolts extend through the holes in the lower flange of the heat pipe, through the discrete skin doubler sections and are received in the respective inserts. However, in between the discrete skin doubler sections, only a thermally conductive adhesive is provided between the CFRP panel skin and the underside of the lower flange of the heat pipe. The discrete sections of skin doubler would provide increased shear strength at the remote ends of the heat pipe where these forces are greatest, whereas the bond between the heat pipe and the CFRP panel between these sections would be provided by the adhesive. Such adhesive may have physical properties of increased flexibility over the adhesive between the discrete skin doubler sections and CFRP skin/heat pipe flange to account for the increased adhesive bond thickness in this section.

A laminate CFRP panel, or the CFRP skins of a CFRP sandwich panel, may be constructed with the plies of the skin/panel arranged such that the woven fibres extend in varying directions, or alternating in a number of set directions (e.g. 0°, and +/−60°, or 0°, +/−45° and 90°) relative to a reference directional axis of the panel/skin. Such construction of CFRP panel/skin is known as isotropic or quasi-isotropic. Such materials exhibit strength and stiffness properties which are substantially equal in all directions. However, and alternative construction of panel/skin may include the woven fibres of the CFRP aligned in a particular direction, known as an orthotropic or anisotropic material, in which particular strength and stiffness is exhibited in a specific direction. The invention is not limited to any particular type of CFRP panel construction and is intended to apply equally to all such CFRP configurations.

The embodiments of the invention described above all comprise an arrangement of four bolts to mechanically secure an upper or lower flange of a distal end of a heat pipe to a CFRP panel. However, the invention is not intended to be limited to such configuration of structure, and also applies to any geometry of heat tube flange which allows clamping by any number of fasteners in any pattern or combination. Furthermore, the bolt-receiving inserts are shown and described as having heads with stems depending therefrom with flared flange ends. However, these exemplary configurations of inserts are not intended to limit the invention and variations in structures to enable the inserts to be secured within a recess once a suitable filler or adhesive such as the potting compound described, is filled in the cavity.

The exemplary embodiments of the invention described above all comprise one heat pipe secured to a CFRP panel. However, it will be appreciated that the invention is not intended to be limited to such configuration and panels with a plurality of heat pipes mounted thereto are intended to fall within the scope of the invention. In addition, the figures show heat pipes of a certain proportion for the sake of ease and clarity of reference. However, the particular proportions of the heat pipes, and indeed, the CFRP panel, skin, skin doubler and other features, are not intended to be limiting and the invention is intended to encompass configurations of varying dimensions and relative proportions. For example, the heat pipes may be longer than shown in the figures.

The embodiment of the invention shown in the drawings and described above are exemplary embodiments only and are not intended to limit the scope of the invention, which is defined by the claims hereafter. It is intended that any combination of non-mutually exclusive features described herein are within the scope of the present invention.

The invention claimed is:

1. An apparatus comprising:
a structural panel suitable for use in a satellite;
an elongate heat pipe mounted to the structural panel, the heat pipe and the structural panel having different coefficients of thermal expansion resulting in different thermal expansions of the heat pipe and the structural panel, wherein the heat pipe comprises a pipe with an integral flange, the heat pipe being mounted to a material of the structural panel with a thermally conductive adhesive which is intermediate distal ends of the heat pipe, wherein the adhesive is omitted proximate at least one distal end of the heat pipe, and wherein a portion of the heat pipe adhered to the material of the structural panel by the thermally conductive adhesive intermediate the distal ends of the heat pipe lies in a first plane and the at least one distal end lies in either the first plane or a second plane that is parallel to the first plane; and
at least one bolt and at least one cooperating threaded receiving element, wherein the at least one distal end of the heat pipe without adhesive is in contact with the material of the structural panel and mechanically secured to the material of structural panel by the at least one bolt passing through the integral flange and received in the at least one cooperating threaded receiving element, wherein the at least one bolt is thereby arranged to absorb a greater portion of shear stress than the adhesive caused by said different thermal expansions.

2. The apparatus according to claim 1, wherein the at least one cooperating threaded receiving element comprises an insert embedded within the structural panel.

3. The apparatus according to claim 1, wherein the at least one bolt comprises four bolts securing the heat pipe to the panel, the four bolts being configured in a substantially quadrilateral arrangement.

4. The apparatus according to claim 1, wherein the adhesive proximate the at least one end of the heat pipe terminates at least 10 mm from a central axis of a nearest one of the bolts securing the heat pipe to the panel.

5. The apparatus according to claim 1, wherein the structural panel comprises a carbon fiber reinforced plastic (CFRP) sandwich panel and the heat pipe is metallic.

6. The apparatus according to claim 1, wherein the integral flange extends from the at least one distal end of the heat pipe and the at least one bolt extends through the integral flange into the structural panel.

7. The apparatus according to claim 1, wherein the at least one distal end of the heat pipe is tapered.

8. The apparatus according to claim 1, further comprising a skin doubler comprising a layer of panel material bonded to a surface of the structural panel, and the heat pipe is bonded and bolted to the skin doubler.

9. The apparatus according to claim 1, wherein the heat pipe is embedded within the structural panel.

10. The apparatus according to claim 9, wherein the flange extends from the at least one distal end of the heat pipe, the flange is disposed against a surface of the structural panel, and the at least one bolt extends through the flange into the structural panel.

11. A method of manufacturing the apparatus according to claim 1, comprising:
bonding the elongate heat pipe with the thermally conductive adhesive to the material of the structural panel which is intermediate the distal ends of the heat pipe and omitting the adhesive proximate the at least one distal end of the heat pipe; and mechanically securing the at least one distal end of the heat pipe without adhesive to the structural panel by the at least one bolt received in the cooperating threaded receiving element.

12. The method according to claim 11, wherein the threaded receiving element comprises a threaded insert, and the method further comprises embedding the insert within the structural panel and fixing the insert in place with a securing compound.

13. The method according to claim 11, further comprising curing the adhesive bonding the heat pipe to the structural panel during or after the at least one bolt is secured to the panel.

* * * * *